R. W. Courts,
*Sewing Machine Caster.*
No. 107,666.    Patented Sep. 27, 1870.
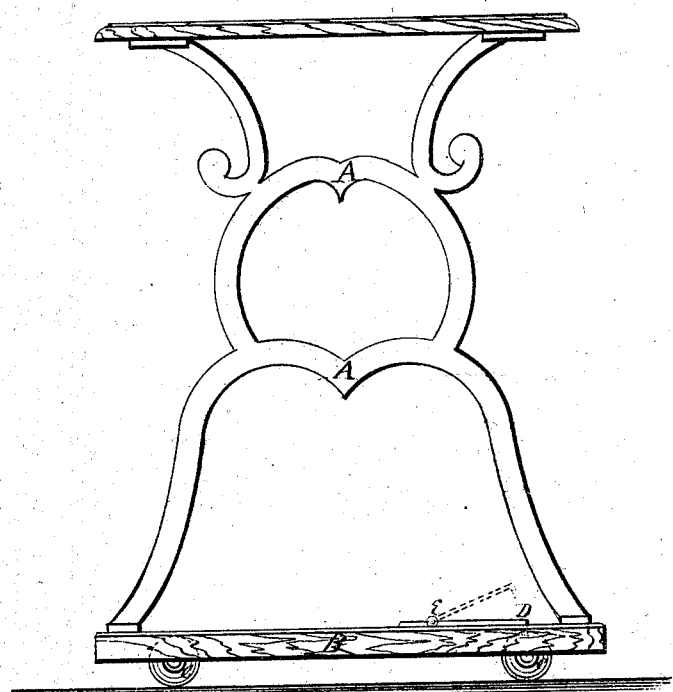
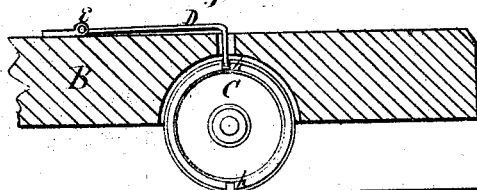
Witnesses:    Richard Winn Courts, Inventor.

United States Patent Office.

RICHARD WINN COURTS, OF RUSSELLVILLE, KENTUCKY.

Letters Patent No. 107,666, dated September 27, 1870.

IMPROVEMENT IN ROLLERS FOR SEWING-MACHINES.

The Schedule referred to in these Letters Patent and making part of the same

I, RICHARD WINN COURTS, of Russellville, in the county of Logan and State of Kentucky, have invented certain Improvements for Moving Sewing-Machines, of which the following is a specification.

Nature and Object of the Invention.

The object of my invention is to provide a roller for sewing-machines that can be prevented from turning when desired; and It consists in combining a hinged hook or catch with a roller, in such a manner that the hook can be made to engage with a notch in the periphery of the roller, and thus prevent it from turning, when desired.

Figure 1 is a side view of my invention as applied to a sewing-machine;

Figure 2 is a top view of the hinged hook or catch and strip of wood; and

Figure 3 is longitudinal section of the strip of wood, hinged hook, and roller.

A is the sewing-machine frame.

B, the strip of wood, to which are attached the roller and hinged hook or catch.

C is the roller.

D is the hook or catch, hinged at e.

h h are the notches in the roller.

A Description of the Construction and Operation of my Invention.

To the sewing-machine A is attached the strip of wood B, extending from under the front and back feet of the sewing-machine, and fastened to the feet.

The roller C is let into said strip, near each end of the strip, by a mortise from below, which does not go through the strip.

The hook or catch D, hinged at e, is fastened on the top of said strip of wood, so as to drop through a small aperture in the strip of wood, and catch in the notches h h in periphery of the roller below, and prevent the roller from turning, which causes the machine to remain stationary, when desired. The hook or catch D, having a hinge at e, when thrown back, the machine can be moved in any direction on said rollers with very little force, to any desired position.

Each sewing-machine requires two strips and four rollers, with a hinged hook or catch to each roller, or the hook or catch may be attached to the two front rollers only.

Claim.

I claim as my invention—

The hinged hook or catch D, in combination with the notched roller C, and strip of wood B, extending from front to back feet of sewing-machine, substantially as shown and described.

RICHARD WINN COURTS.

Witnesses:
GEORGE L. GILLAM,
P. G. WOOTEN.